United States Patent
Xin et al.

(10) Patent No.: US 11,588,765 B2
(45) Date of Patent: Feb. 21, 2023

(54) MESSAGE PROCESSING METHOD, MESSAGE PROCESSING SYSTEM, MESSAGE PROCESSING APPARATUS, COMPUTING DEVICE, AND COMPUTER-READABLE STORAGE MEDIUM

(71) Applicant: BOE TECHNOLOGY GROUP CO., LTD., Beijing (CN)

(72) Inventors: Yanli Xin, Beijing (CN); Yingkai Xie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/514,449

(22) Filed: Oct. 29, 2021

(65) Prior Publication Data
US 2022/0255886 A1 Aug. 11, 2022

(30) Foreign Application Priority Data
Feb. 9, 2021 (CN) .......................... 202110176294.3

(51) Int. Cl.
*H04L 51/046* (2022.01)
*H04L 51/18* (2022.01)

(52) U.S. Cl.
CPC ............ *H04L 51/046* (2013.01); *H04L 51/18* (2013.01)

(58) Field of Classification Search
CPC ..... H04L 51/046; H04L 51/18; H04L 51/066; H04L 41/0266
See application file for complete search history.

(56) References Cited

U.S. PATENT DOCUMENTS

| | | | | |
|---|---|---|---|---|
| 7,752,035 B2* | 7/2010 | Oon | ....................... | G06F 40/169 705/2 |
| 8,000,984 B2* | 8/2011 | Hasan | .................... | G16H 50/20 705/2 |
| 8,260,635 B2* | 9/2012 | Hasan | .................... | G16H 50/20 705/2 |
| 8,850,057 B2* | 9/2014 | Natoli | ..................... | H04L 45/00 709/230 |
| 10,504,619 B2* | 12/2019 | Lloyd | .................... | G16H 10/60 |
| 11,348,689 B1* | 5/2022 | Gonzales, Jr. | ...... | G06F 3/04817 |
| 2005/0138210 A1* | 6/2005 | Shkvarchuk | .......... | H04L 69/329 709/246 |
| 2007/0016450 A1* | 1/2007 | Bhora | .................... | G16H 40/67 705/3 |

(Continued)

*Primary Examiner* — Sargon N Nano
(74) *Attorney, Agent, or Firm* — Myers Bigel, P.A.

(57) ABSTRACT

Disclosed are a message processing method, a message processing system, a message processing apparatus, a computing device, and a computer-readable storage medium. The message processing method includes receiving a first message sent by at least one client in the ward, determining whether the format of the first message is at least one of a plurality of first preset formats, in response to the format of the first message is at least one of a plurality of first preset formats, converting the format of the first message into a second preset format according to a preset conversion rule corresponding to the format of the first message, so as to obtain a second message, receiving a data processing request, and in response to the data processing request, processing the second message.

18 Claims, 6 Drawing Sheets

(56) References Cited

U.S. PATENT DOCUMENTS

| | | | |
|---|---|---|---|
| 2008/0046292 A1* | 2/2008 | Myers | G06F 16/283 |
| | | | 705/3 |
| 2009/0222283 A1* | 9/2009 | Lassetter | G06Q 10/10 |
| | | | 705/2 |
| 2011/0001605 A1* | 1/2011 | Kiani | G16H 40/67 |
| | | | 235/492 |
| 2011/0106564 A1* | 5/2011 | Hachmeister | G16H 30/20 |
| | | | 705/3 |
| 2011/0113111 A1* | 5/2011 | Reed | H04L 67/02 |
| | | | 709/206 |
| 2013/0010650 A1* | 1/2013 | Zhang | H04L 12/66 |
| | | | 370/259 |
| 2015/0332011 A1* | 11/2015 | Ting | G16H 40/67 |
| | | | 705/2 |
| 2018/0227369 A1* | 8/2018 | DuCray | G16H 40/20 |
| 2019/0325053 A1* | 10/2019 | Tsai | G16H 10/65 |
| 2019/0354900 A1* | 11/2019 | O'Shea | G06Q 40/08 |
| 2020/0075158 A1* | 3/2020 | Muthya | G16H 40/40 |
| 2020/0152337 A1* | 5/2020 | Rego | G16H 40/60 |
| 2020/0321133 A1* | 10/2020 | Gonzales, Jr. | G16H 40/20 |
| 2021/0005310 A1* | 1/2021 | Noro | G06Q 10/06312 |
| 2022/0223244 A1* | 7/2022 | Lloyd | G06F 16/33 |
| 2022/0367034 A1* | 11/2022 | Lampo | G16H 20/40 |

\* cited by examiner

MESSAGE PROCESSING METHOD, MESSAGE PROCESSING SYSTEM, MESSAGE PROCESSING APPARATUS, COMPUTING DEVICE, AND COMPUTER-READABLE STORAGE MEDIUM

RELATED APPLICATION

The present application claims the benefit of Chinese Patent Application No. 202110176294.3 filed on Feb. 9, 2021, the entire disclosure of which is incorporated herein by reference.

TECHNICAL FIELD

The present disclosure generally relates to the field of data processing, and specifically relates to a message processing method, a message processing system, a message processing apparatus, a computing device, and a computer-readable storage medium.

BACKGROUND

With the rapid development of Internet information technology, smart medical care has been widely used in more and more hospitals. Among them, smart medical care is a medical service model centered on patient data, which can help hospitals realize intelligent medical care for people and intelligent management for things, especially in the field of smart wards. Its main concept is to provide supplementary medical services as the goal, and that, by integrating the ward medical information system and cooperating with the communication function of the medical Internet of Things (IoT), medical staff may provide services in real time without having to wait on the patient's side at any time.

SUMMARY

According to an aspect of the present disclosure, there is provided a message processing method, the method comprising: receiving a first message sent by at least one client in a ward; determining whether a format of the first message is at least one of a plurality of first preset formats; in response to the format of the first message being at least one of the plurality of first preset formats, converting the format of the first message into a second preset format according to a preset conversion rule corresponding to the format of the first message to obtain a second message; receiving a data processing request; and processing the second message in response to the data processing request.

In some embodiments, the converting the format of the first message into a second preset format according to a preset conversion rule corresponding to the format of the first message to obtain a second message comprises: parsing the first message according to a parsing rule corresponding to the format of the first message to obtain a message object; and according to a preset editing rule, processing the message object to obtain the second message.

In some embodiments, before the receiving a first message sent by at least one client in a ward, the method further comprises: monitoring the interface status of each client in at least one client in the ward, the receiving a first message sent by at least one client in a ward comprises: in response to an interface status indicating that there is a new first message, receiving the first message sent by the client corresponding to the interface.

In some embodiments, the receiving a data processing request comprises: receiving a message status checking instruction, wherein the message status checking instruction comprises a first client identifier; the processing the second message in response to the data processing request comprises: in response to the message status checking instruction, monitoring the message status of the second message corresponding to the first client identifier; after the monitoring the message status of the second message corresponding to the first client identifier, the method further comprises: sending the message status to the client corresponding to the first client identifier.

In some embodiments, the monitoring the message status of the second message corresponding to the first client identifier comprises: based on the message status, determining whether the alarm condition is met; in response to the alarm condition is met, sending alarm prompt information to the client corresponding to the first client identifier.

In some embodiments, the receiving a data processing request comprises: receiving a message data volume checking instruction, the message data volume checking instruction comprises the second client identifier; the processing the second message in response to the data processing request comprises: in response to the message data volume checking instruction, counting the data volume of the second message corresponding to the second client identifier, after the counting the data volume of the second message corresponding to the second client identifier, the method further comprises: sending the data volume to the client corresponding to the second client identifier.

In some embodiments, the receiving a data processing request comprises: receiving a disconnection request, the disconnection request comprises a third client identifier; after the receiving a disconnection request, the method further comprises: in response to the disconnection request, disconnect the client corresponding to the third client identifier.

In some embodiments, the second message comprises at least one business data corresponding to the at least one client, and the processing the second message in response to the data processing request comprises: in response to the data processing request, processing the at least one service data.

In some embodiments, the data processing request comprises a data identifier, the in response to the data processing request, processing the at least one business data comprises: in response to the data processing request, processing a target business data, the target business data is business data corresponding to the data identifier in the at least one business data.

In some embodiments, the receiving a data processing request comprises: receiving a query request; the in response to the data processing request, processing a target business data comprises: parsing the query request to determine the data identifier to be queried; and based on the data identifier to be queried, obtaining the target business data and sent it to the at least one client.

In some embodiments, the receiving a data processing request comprises: receiving a deletion request; the in response to the data processing request, processing a target business data comprises: parsing the deletion request and determining the data identifier to be deleted; searching for target business data corresponding to the data identifier to be deleted; and deleting the target business data.

In some embodiments, the receiving a data processing request comprises: receiving a modification request; the in response to the data processing request, processing a target business data comprises: parsing the modification request and determining the data identifier to be modified; searching for target business data corresponding to the data identifier to be modified; and modifying the target business data.

In some embodiments, the receiving a first message sent by at least one client in a ward comprises: obtaining a status data of at least one client in the ward, after the obtaining a status data of at least one client in a ward, the method further comprises: determining whether the status data meets a preset condition; and in response to the status data meets the preset condition, generating a control instruction corresponding to the at least one client and sending it to the at least one client to control the at least one client to perform a corresponding operation.

In some embodiments, the at least one client comprises at least one of an intelligent phone, a personal computer, a tablet computer, an infusion monitor, a physical sign monitor, an intelligent blood pressure meter, an intelligent blood glucose meter, a medical personal digital assistant, a ward mobile cart, a ward TV voice remote control, a ward intelligent speaker, a ward door or window, or a ward curtain.

In some embodiments, the first message comprises at least one of a medical event message, a medical behavior message, or patient information.

According to another aspect of the present disclosure, there is provided a message processing system, the system comprising: a server and at least one client in a ward, the at least one client is configured to send a first message to the server; the server is configured to receive a first message sent by at least one client in the ward; determine whether a format of the first message is at least one of a plurality of first preset formats; in response to the format of the first message is at least one of a plurality of first preset formats, convert the format of the first message into a second preset format according to a preset conversion rule corresponding to the format of the first message, so as to obtain a second message; the at least one client is further configured to send a data processing request to the server; the server is further configured to receive a data processing request; and in response to the data processing request, processing the second message.

In some embodiments, the second preset format is a standard information format commonly used by the server.

According to yet another aspect of the present disclosure, there is provided a message processing apparatus, the apparatus comprising: a first receiver, configured to receive a first message sent by at least one client in a ward; a determiner, configured to determine whether a format of the first message is at least one of a plurality of first preset formats; a converter, configured to in response to the format of the first message being at least one of the plurality of first preset formats, converting the format of the first message into a second preset format according to a preset conversion rule corresponding to the format of the first message to obtain a second message; a second receiver, configured to receive a data processing request; and a message processor, configured to process the second message in response to the data processing request.

According to a further aspect of the present disclosure, there is provided computing device, the computing device comprising a memory, a processor, and computer instructions stored in the memory and executable on the processor, the processor being configured to implement the message processing method as above when executing the computer instructions.

According to a further aspect of the present disclosure, there is provided a non-transitory computer-readable storage medium having computer instructions stored thereon, the computer instructions being configured to implement the message processing method as above.

BRIEF DESCRIPTION OF DRAWINGS

By reading the detailed description of the non-limiting embodiments with reference to the following drawings, other features, purposes and advantages of the present disclosure will become more apparent.

DETAILED DESCRIPTION

The present disclosure will be further described in detail below with reference to the accompanying drawings and embodiments. It may be understood that the specific embodiments described here are only used to explain the related disclosure, but not to limit the disclosure. In addition, it should be noted that, for ease of description, only the parts related to the disclosure are shown in the drawings.

It should be noted that the embodiments in the present disclosure and the features in the embodiments may be combined with each other if there is no conflict. Hereinafter, the present disclosure will be described in detail with reference to the drawings and in conjunction with the embodiments.

The terms used in the present disclosure are only used to describe each exemplary embodiment in the present disclosure, and are not intended to limit the present disclosure. As used herein, the singular forms "a", "an" and "the" are intended to also comprise the plural forms, unless the context clearly dictates otherwise. It should also be understood that the terms "comprise" and "comprising" when used in the present disclosure refer to the existence of the mentioned features, but do not exclude the existence of one or more other features or the addition of one or more other features. As used herein, the term "and/or" comprises any and all combinations of one or more of the associated listed items. It will be understood that although the terms "first", "second", "third", etc. may be used herein to describe various features, these features should not be limited by these terms. These terms are only used to distinguish one feature from another.

Unless otherwise defined, all terms (comprising technical and scientific terms) used in the present disclosure have the same meanings as commonly understood by those of ordinary skill in the art to which the present disclosure belongs. It should also be understood that terms such as those defined in commonly used dictionaries should be interpreted as having meanings consistent with their meanings in the relevant field and/or the context of this specification, and will not be idealized or overly interpreted in a formal sense, unless explicitly defined as such herein.

In recent years, the level of medical services in society has been continuously improved. More and more hospitals have begun to implement smart medical service construction, thereby enhancing their competitiveness and innovation. Among them, smart wards, as an important field of smart medical care, can take assisting the medical supply as a goal and improve the nursing experience of patients during hospitalization, which is an important sign of the hospital informatization process.

In related technologies, smart ward products come from different independently operating IoT device systems, and need to use different data transmission formats for data processing, resulting in a low degree of application of various systems and cumbersome operations in managing different kinds of IoT devices, which increases the construction cost of smart wards and reduces work efficiency.

The disclosure provides a message processing method, a message processing system, a message processing apparatus, a computing device, and a computer-readable storage medium. In the embodiment of the present disclosure, since the first message sent by at least one client in the ward is converted into a unified preset format (a second preset format), the data messages of independent clients in the smart ward can be integrated. So, it may be compatible with more clients, improve the applicability of each client, realize the data interaction between the clients, reduce the construction cost of the smart ward, and greatly improve the work efficiency of the smart ward.

Figure 1:
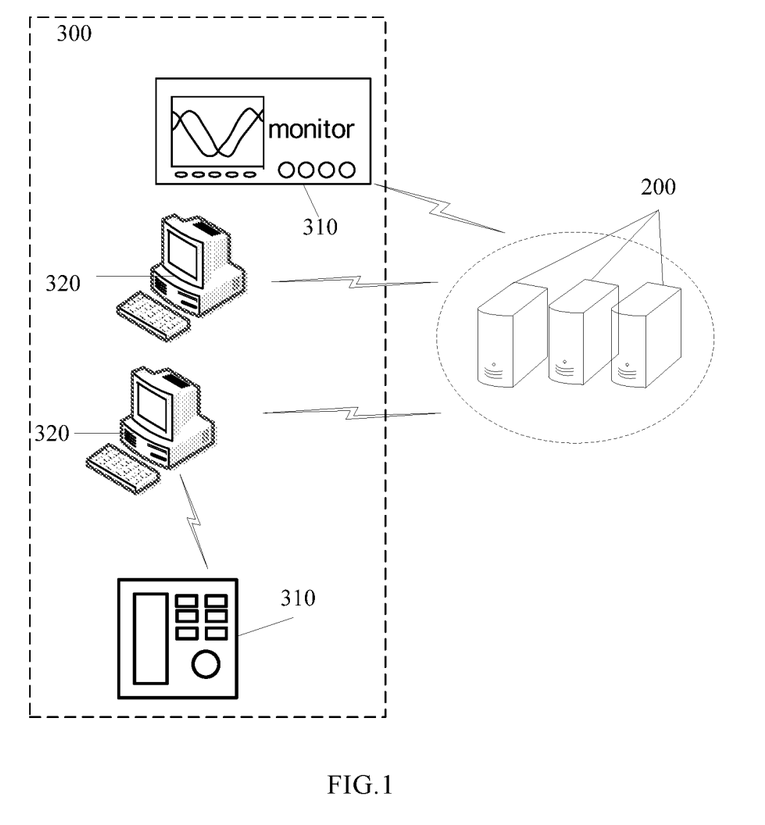
FIG. 1 is a schematic structural diagram of a message processing system provided by some embodiments of the disclosure.

FIG. 1 is a structural diagram of an implementation environment of a message processing system provided by an embodiment of the present disclosure. As shown in FIG. 1, the implementation environment structure comprises: at least one client 300 in the ward and server 200. The server 200 directly or indirectly establishes a network connection with at least one client 300.

In some embodiments, one or more ward service systems (not shown) may run on the at least one client 300.

In some embodiments, at least one client 300 may comprise an electronic device 320 such as a personal computer, a tablet computer, and an intelligent phone with data processing capabilities. The server 200 can be configured on an independent physical server, or a server cluster or distributed system composed of a plurality of physical servers, or it can also be a cloud server that provides basic cloud computing services such as cloud services, cloud databases, cloud computing, cloud functions, cloud storage, network services, cloud communications, middleware services, domain name services, security services, CDN, as well as big data and artificial intelligent platforms.

In some embodiments, at least one client 300 may comprise an IoT device 310. The IoT device 310 may directly establish a network connection with the server 200 or indirectly establish a network connection with the server 200, that is, the IoT device 310 establishes a network connection with the electronic device 320 and establishes a network connection with the server 200 via electronic device 320.

In some embodiments, IoT device 310 is an intelligent device. The IoT device 310 may be connected to the server 200 or the electronic device 320 in a wireless or wired manner, and the wireless connection may be one or more of a Bluetooth connection, a WIFI connection, an RFID identification connection, or an NFC identification connection.

It should be noted that, the Internet of Things device 300 may comprise basic device in a ward, and may also comprise medical monitoring device. Medical monitoring device may comprise intelligent monitoring device such as an infusion monitor, a physical sign monitor, an intelligent blood pressure meter, an intelligent blood glucose meter, a medical personal digital assistant (PDA), etc.; basic ward device may comprise, for example, a ward mobile cart, a ward TV voice remote control, a ward intelligent speaker, a ward door or window, a ward curtain and other devices.

In some embodiments, the IoT device 310 (for example, a medical monitoring device) is configured to monitor the patient's physical sign data and send the physical sign data to the server 200, it also can send the physical sign data to the electronic device 320 so that the electronic device 320 will send a first message that comprises the physical sign data to the server. The physical sign data may comprise respiration, heart rate, and turning over information, for example.

It should be noted that a medical PDA, as the PDA used in hospitals, is also called a medical handheld terminal. It is a data collection, storage, and transmission device specially built for mobile medical treatment, mobile ward rounds, and patient information management. The medical PDA may collect patient, medicine, material and other information, store related information, and transmit the information to the database center in real time with the help of wireless network. For example, a medical PDA may query patient information, quickly complete the entry of patient temperature, blood pressure, and other information, and one may also know the patient's disease information through the medical PDA.

Figure 2:
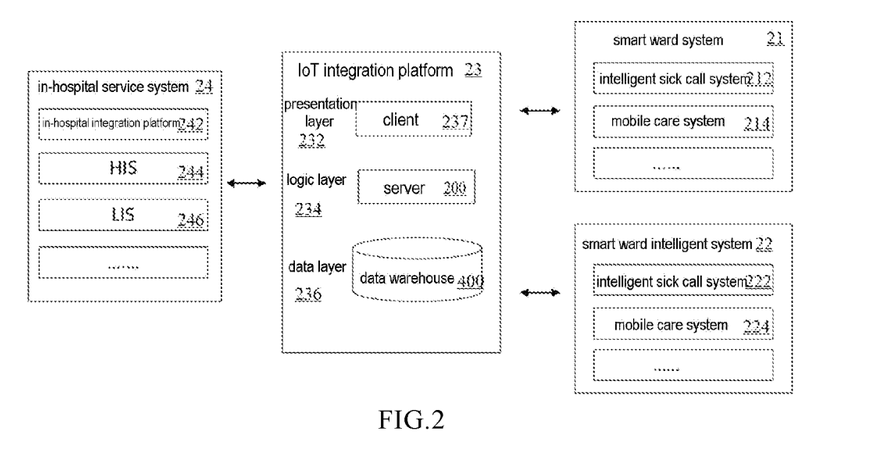
FIG. 2 is a schematic structural diagram of a message processing system provided by some embodiments of the disclosure.

In some embodiments, as shown in FIG. 2, the ward service system may comprise smart ward systems 21, which may comprise intelligent sick call system 212, mobile care system 214, physical sign monitoring system, intelligent infusion system, mobile nursing system, bedside interactive system in ward, nurse station whiteboard interactive system, etc. which are dispersed independently of each other.

In some embodiments, the ward service system may also comprise in-hospital service system 24, which may comprise in-hospital integration platform 242, hospital information system (i.e., HIS) 244, and laboratory information management system (LIS) 246 etc.

In some embodiments, the IoT device 310 may comprise a plurality of smart ward intelligent devices 22 dispersed independently of each other in the ward. The smart ward systems 21 may correspond to the smart ward intelligent devices 22 respectively. For example, the intelligent sick call system 212, the mobile care system 214 may be installed on the intelligent sick call device 222, the mobile care device 224, respectively.

In some embodiments, at least one client 300 and server 200 may form a message processing system (IoT integration platform) 23. The IoT integration platform 23 can use at least one client 300 as the presentation layer 232, as the visual display part of the functional modules, to facilitate users to view and operate; the server 200 as the logic layer 234, to receive, transmit, convert and process relevant data corresponding to the first message of at least one client in each ward.

In some embodiments, IoT integration platform 23 also comprises data warehouse 400. The IoT integration platform 23 may use the data warehouse 400 as the data layer 236 to store all the data information used by the related smart wards. The data warehouse 400 may exist in the server 200, or may exist as a separate data storage device.

In some embodiments, in the message processing system (IoT integration platform) 23, at least one client 300 is configured to send a first message to the server 200; the server 200 is configured to receive a first message sent by at least one client 300 in the ward; determining whether the format of a first message is at least one of a plurality of first preset formats; in response to the format of the first message is at least one of a plurality of first preset formats, convert the format of the first message into a second preset format according to a preset conversion rule corresponding to the format of the first message, so as to obtain a second message; at least one client 300 is further configured to send a data processing request to the server 200; the server 200 is further configured to receive the data processing request; and in response to the data processing request, process the second message.

For example, the second preset format is a standard information format commonly used by the server.

In some embodiments, in response to the format of the first message is not at least one of the plurality of first preset formats, the system may report an error or prompt for manual intervention.

In the message processing system provided in this embodiment, the server 200 may be compatible with a plurality of first preset formats, and whether at least one client in the ward is compatible with the server is determined by determining whether the format of the first message is at least one of the plurality of first preset formats. In this way, server 200 can be compatible with various intelligent electronic devices 320 and IoT device 310 in the ward, extending information to the patient's side, so that medical risks can be detected earlier, ensuring smooth message communication among clients in the smart ward, and the data flow can be monitored in real time, which improves the overall work efficiency.

In order to facilitate the understanding and description, the message processing method, the message processing system, the message processing apparatus, the computing device, and the computer-readable storage medium provided by the embodiments of the present disclosure will be explained in detail through FIG. 3 to FIG. 10 below.

Figure 3:
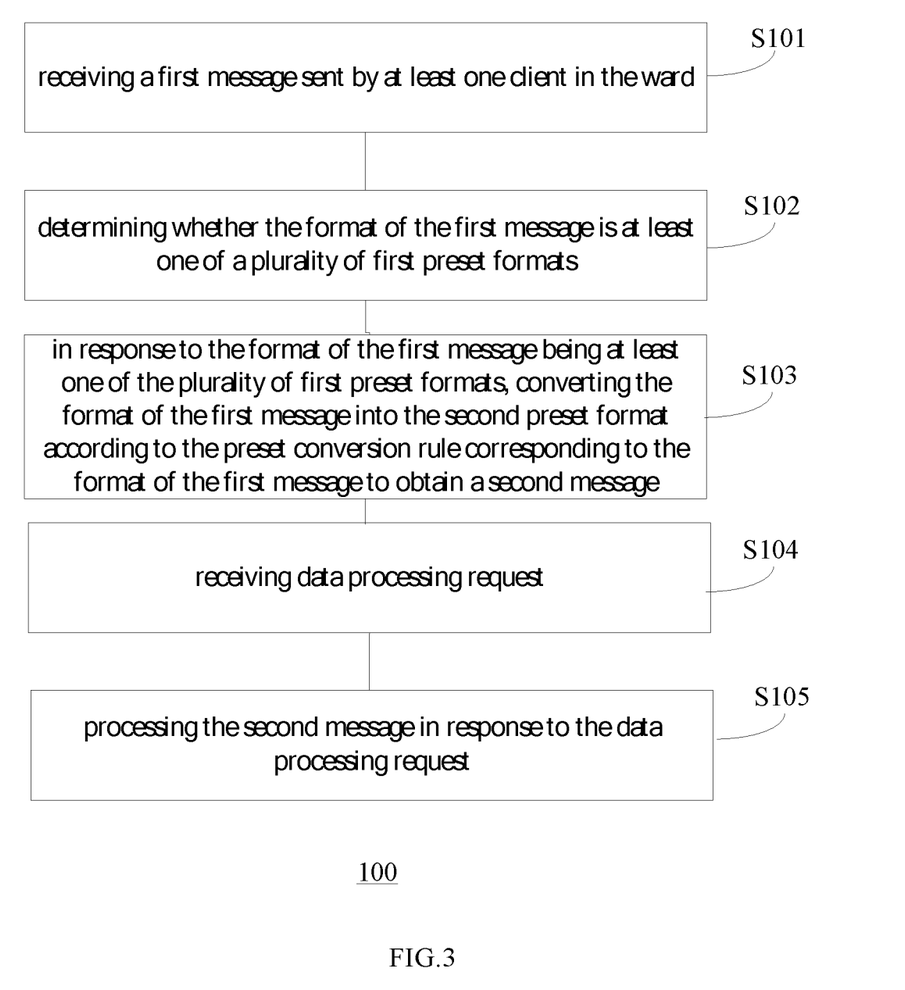
FIG. 3 is a schematic flowchart of a message processing method provided by some embodiments of the disclosure.

FIG. 3 is a schematic flowchart of a message processing method 100 provided by an embodiment of the present disclosure, and the method 100 can be applied to the server 200. As shown in FIG. 3, the method 100 comprises:

S101. Receive a first message sent by at least one client in a ward. For example, at least one client in the ward may communicate with the server through their corresponding data interface. The server can monitor the interface status of at least one client in the ward in real time, and the interface status is configured to characterize the data update status of each data interface through which the at least one client in the ward accesses the server.

Figure 4:
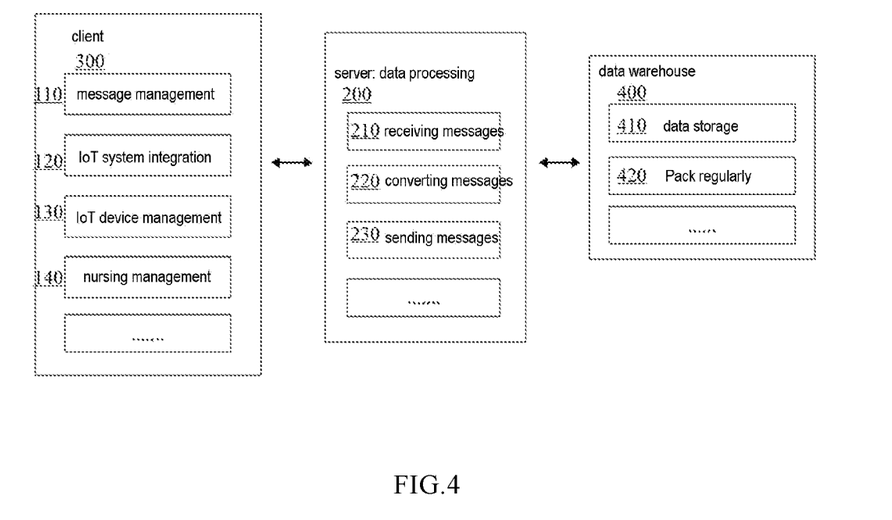
FIG. 4 is a schematic structural diagram of a message processing system provided by some embodiments of the disclosure.

In some embodiments, referring to FIG. 4, the first message can be visually displayed on at least one client 300, so that users can view and perform corresponding operations, such as message management 110, IoT system integration 120, IoT device management 130, nursing management 140, and so on. Data processing operations can be performed on server 200 to receive, transmit, convert and process relevant data corresponding to each first message sent by at least one client 300 in the ward, such as receiving messages 210, converting messages 220, sending messages 230 and so on.

In some embodiments, the data warehouse 400 is used as the data layer 236 to storage 410 all the data information used in the related smart wards. The data warehouse 400 may be used to pack regularly 420 related data.

In some embodiments, before receiving the first message sent by at least one client 300 in the ward, the method further comprises: monitoring the state of the interface of each client in the at least one client 300 in the ward, and step S101 comprises: in response to the status of an interface indicating that there is a new first message, receiving the first message sent by the client corresponding to the interface. For example, the server 200 may be configured with an interface state monitoring function for at least one client in the ward. The interface state monitoring function may be provided with a preset time period, for example, and the preset time period may be user-defined configuration. When the server 200 detects that the state of a certain client's interface indicates that the client has a new first message, it receives the first message sent by the client corresponding to the interface. When the server detects that the interface status of at least one client in the ward is not updated within the preset time, it means that there is no new first message in the at least one client in the ward.

In some embodiments, at least one client 300 may send an interface status checking instruction to the server 200, and the interface status checking instruction comprises an identity identifier indicating the client, so that the server 200 receives the interface status checking instruction and sends the status of the interface corresponding to the client's identity identifier to the client corresponding to the client's identity identifier in response to the interface status checking instruction.

In some embodiments, the first message may be a business message sent by at least one client in the ward which is received by the server by calling a data interface corresponding to at least one client in the ward. The first message may comprise at least one of a medical event message, a medical behavior message, or patient information.

In some embodiments, the second message comprises at least one business data corresponding to the at least one client, and in response to the data processing request, processing the second message comprises: in response to the data processing request, processing the at least one business data. For example, the business data may be, for example, the diagnosis data of the patient, the detection data of the patient, or the identity data of the patient.

In some embodiments, the first message may comprise segments, fields, dividers, and components. For example, the first message may comprise a plurality of segments, and the segment identifier comprises three characters. For example, the first message of ADT may comprise the following segments: MSH, EVN, PID, and PVI. Among them, MSH indicates what event triggered the message.

For example, receiving the first message sent by at least one client in the ward comprises: receiving the first message sent by at least one client in the ward via at least one of Bluetooth communication, WiFi communication, RFID communication, or NFC communication. When there are a plurality of clients in the ward, the first message sent by each client may comprise different data formats, that is, data of different standards 510. For example, the first message sent by the first client may be custom data format 1 512, and the first message sent by the second client may be custom data format 2 514.

S102, determining whether a format of the first message is at least one of the plurality of first preset formats.

For example, the first message sent by each client may comprise different data formats, and the server 200 may be compatible with different data formats. For example, the server 200 may pre-store a plurality of first preset formats and the server 200 may be provided with a determiner to determine whether the format of the first message is at least one of the plurality of first preset formats.

S103, in response to the format of the first message being at least one of the plurality of first preset formats, converting the format of the first message into the second preset format according to the preset conversion rule corresponding to the format of the first message to obtain a second message.

For example, converting the format of the first message into a second preset format according to a preset conversion rule corresponding to the format of the first message to obtain a second message comprises: parsing the first message according to a parsing rule corresponding to the format of the first message to obtain a message object; and according to a preset editing rule, processing the message object to obtain the second message. The parsing rule corresponding to the format of the first message refers to a preset rule configured in the server 200 to decode or otherwise process the first message into a message object, such as a preset decoding algorithm. The message object refers to the substantive information or content carried or transmitted by the first message. The preset editing rule refers to a preset rule configured in the server 200 to edit a message object into a second preset format, such as a preset encoding algorithm.

For example, the server 200 may be provided with a plurality of preset conversion rules corresponding to a plurality of first preset formats, respectively. The plurality of preset conversion rules are configured to respectively convert different data formats into a second preset format. For example, the second preset format is a standard information format commonly used by server 200. In this way, the different data formats of the first message may be converted into the second preset format, so that the server 200 may be compatible with different data formats.

It should be noted that, the preset conversion rule may be embodied as a preset message converter, which may comprise the mapping relationship between the message object and the preset format, or may adopt a unified message conversion mechanism, which comprises various medical data exchange standards, thereby converting the first message into the second preset format to obtain the second message. Wherein, the message exchange standard may be, for example, HL7 2.x, HL7 3.x, HL7 FHIR, or other custom text formats.

Figure 5:
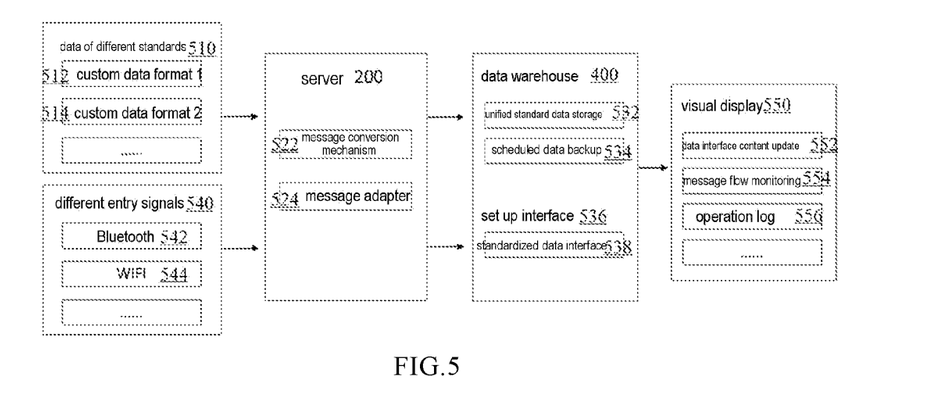
FIG. 5 is a schematic structural diagram of a message processing system provided by some embodiments of the disclosure.

As shown in FIG. 5, the business messages sent by a plurality of clients in the ward may be in different data formats, such as custom data format 1 512, custom data format 2 514, and different ward service systems can communicate with the server 200 via different entry signals 540, and the different entry signals 540 may be for example Bluetooth 542, WiFi 544, or the like. The Server 200 may process the first messages of different data formats into a unified second preset format based on the message conversion mechanism 522 and the message adaptor 524 to obtain the second message. The second message may be stored 532 into the data warehouse 400 in the unified standard data format, for example, the data may be stored in the manner of a scheduled data backup 534.

In some embodiments, the data warehouse 400 can open 536 to the outside with a standardized data interface 538, so that the server may obtain the business data stored in the data warehouse 400 by calling the standardized data interface 538. In addition, the IoT integration platform 23 integrated in the server may implement the visual display 500 function through at least one client 300. The display content function of the visual display 500 may comprise, for example, data interface content update 552, message flow monitoring 554, operation log 556, and message data volume statistics, etc.

S104, receiving data processing request.

S105, processing the second message in response to the data processing request.

In some embodiments, the message processing system (IoT integration platform) 23 may also be provided with a message status viewing function. For example, step S104 comprises: receiving a message status checking instruction, where the message status checking instruction comprises the first client identifier; step S105 comprises: in response to the message status checking instruction, monitoring the message status of the second message corresponding to the first client identifier, after the monitoring the message status of the second message corresponding to the first client identifier, the method 100 further comprises sending the message status to the client corresponding to the first client identifier.

For example, the message status may comprise, for example, the message receiver, the message sender, unblocked message interaction status, failed message interaction status, message queue backlog status, and the like. For example, the message status monitoring function may be provided with a preset time period, and the preset time period may be custom configured by the user.

In some embodiments, monitoring the message status of the second message corresponding to the first client identifier comprises: based on the message status, determining whether the alarm condition is met; in response to the alarm condition is met, sending alarm prompt information to the client corresponding to the first client identifier. For example, in some embodiments, the message processing system (IoT integration platform) 23 may also be provided with a message alarm function. The message alarm function may be configured with alarm conditions. The user may add, delete, modify, enable, disable the alarm conditions and so on. The alarm condition may be, for example, that client A has data transmitted in within 15 minutes. The server may determine whether the message status meets the alarm condition based on the message status, and if so, it sends an alarm prompt message to the client A. The message status may comprise an unblocked message interaction status. The alarm prompt information may be prompted in a form of a pop-up window on the client, or may be prompted in a form of flashing, for example.

In some embodiments, step S104 comprises: receiving a message data volume checking instruction, the message data volume checking instruction comprises the second client identifier; step S105 comprises: in response to the message data volume checking instruction, counting the data volume of the second message corresponding to the second client identifier. After the counting the data volume of the second message corresponding to the second client identifier, the method 100 further comprises: sending the data volume to the client corresponding to the second client identifier. In this way, in some embodiments, the message processing system (IoT integration platform) 23 may also be provided with a message data volume statistics function, the message data volume comprising statistical analysis of data volume such as message interaction volume, real-time interaction volume, error message volume, service consumption analysis, system received message volume and queue message accumulation volume. In some embodiments, the statistics of the data volume can be displayed on the client in the form of graphs or tables according to user needs.

In some embodiments, step S104 comprises: receiving a disconnection request, the disconnection request comprises a third client identifier; after receiving the disconnection request, the method 100 further comprises: in response to the disconnection request, disconnecting from the client the corresponding to the third client identifier. For example, in some embodiments, the message processing system (IoT integration platform) 23 can also be provided with a registration management function, so that at least one client in the ward may be added, deleted, modified and queried to be managed, and the recipient and the sender of the message may send a message to the server or subscribe the required first message as required.

In some embodiments, the message processing system (IoT integration platform) 23 can also be provided with an authority management function, so as to realize the authority distribution of system functions. According to the user's identity identifier with an operation authority, the user may be assigned an operation authority corresponding to the identity identifier. The identity identifier may comprise, for example, a manager identifier list and a user identifier list. The manager identifier list is configured to store identity identifiers with a first-level operation authority. The first-level operation authority may comprise a modification authority for user identifier list and an editing authority for all diagnostic information; the user identifier list is configured to store the identity identifier with the second-level operation authority, and the second-level operation authority may be the authority to view a diagnostic information.

In some embodiments, the message processing system (IoT integration platform) 23 may also be provided with a message push function. The server 200 sets a timing or manual message push function for at least one accessed client in the ward. The message push function comprises configuration items such as message definition, content filling, message type selection, and sending object selection. When the message push condition is met, the server 200 push related content to the message sending object, and the client can receive the pushed content in real time.

In some embodiments, the message processing system (IoT integration platform) 23 may also be provided with a system configuration function, which can provide a personalized display function on the client in advance, so as to realize custom functions for different clinical needs.

In some embodiments, the functions of the ward service system may comprise the nurse station interactive whiteboard configuration function, the smart ward related application system data supplement function, and the manual push message reminder function to other accessed application systems.

For example, the nurse station interactive whiteboard configuration function comprises: nurse station home page information display configuration; patient information, classification display configuration; ward message sub-module display configuration; and display content configuration of each module; message reminder display content, reminder mode, reminder time and other configuration, shift page display configuration, IoT monitoring page display configuration; statistical content display configuration, etc.

For example, the nurse station interactive whiteboard configuration may provide a variety of interface style options, a plurality of patient list card interface style options, a plurality of page layout methods and other configuration items.

For example, bed interactive system configuration comprises patient home page display information configuration, patient viewable information configuration, nursing function configuration, interface style selection, etc.

The embodiment of the present disclosure provides the data supplement function of the related application system of the smart ward, so that the user may supplement the data information that cannot be obtained from the in-hospital service system in the client, and save it in the data warehouse for the whole hospital to use. The data information obtained from the in-hospital system may be, for example, the addition and maintenance of photos, introductions, and publicity information of ward service personnel, the addition and maintenance of publicity and introduction information such as hospitals and departments, the production and maintenance of satisfaction survey questionnaires, the upload and maintenance of propaganda and education content, and the addition and maintenance of entertainment video and audio materials etc.

In some embodiments, the message processing system (IoT integration platform) 23 may also be provided with a manual push message reminder function to other accessed application systems, for example, manually pushing reminders of pre-surgery precautions to the 34-bed patient in the V2 ward, and select the associated surgery propaganda and education content and remind the patient to check.

In some embodiments, the data processing request comprises a data identifier, and in response to the data processing request, processing the at least one business data comprises: in response to the data processing request, processing the target business data, the target business data being business data corresponding to the data identifier in the at least one business data. For example, when at least one client in the ward needs to perform data processing, the at least one client may send a data processing request to the server. The data processing request comprises a data identifier. The server receives the data processing request and in response to the data processing request, based on the processing rule corresponding to the data processing request, finds the business data corresponding to the data identifier in at least one business data in the second message as the target business data, and processes the target business data.

For example, the server 200 may store the target business data in the data warehouse 400 and open the standardized data interface 538 to the outside, so that the external system or device is able to obtain the target business data by calling the standardized data interface 538; the target business data may also be sent to another client, for example, to an in-hospital service system, so that the in-hospital service system and the client that sends the target business data realize data interaction.

In some embodiments, the data processing request may be processing operations such as adding, deleting, modifying, and querying business data, and the target business data may comprise business data corresponding to at least one client in the ward.

In some embodiments, receiving a data processing request comprises: receiving a query request; and in response to the data processing request, processing the target business data comprises: parsing the query request to determine the data identifier to be queried; and based on the data identifier to be queried, obtaining the target business data and sent it to the at least one client. For example, the data processing request comprises a query request. When at least one client in the ward sends a query request to the server, the query request may comprise the data identifier to be queried, and the server receives and responds to the query request to determine the data identifier to be queried. Then, based on the data identifier to be queried, the target business data is obtained and sent to the corresponding client in accordance with the query rule corresponding to the query request. The query request may also comprise classified query conditions, such as clinical use information, and the server sends the corresponding clinical use information to the client after finding the corresponding clinical use information, so that the user may view the clinical use information through the client. The clinical use information may be, for example, ward information, ward bed list, patient detailed information, surgical monitoring information, shift management information, nursing task information, physical sign monitoring information, and the like.

In some embodiments, the ward information may comprise ward dynamics, ward nursing content, surgical information, high-risk management information, etc.; the ward bed list may comprise the patient's ward and bed, etc.; the surgical monitoring information may comprise the ward patient's surgical progress, scheduling time, etc.; patient detailed information may comprise patient electronic medical records, medical order information, inspection reports, etc.; shift management information may comprise nursing shift content, shift summary and memos, etc.; nursing task information may comprise patient physical sign collection, risk assessment, doctor's order execution information, etc.; the physical sign monitoring information may comprise the real-time monitoring of patient physical sign in the ward, so that early risk warning may be made, and may also comprise the monitoring of the infusion of the ward, so that the real-time infusion status of the patient in the bed may be viewed on the client, and abnormal reminders and margin reminder etc. may be given. Ward drug management and ward quality control information may also be viewed in real time.

In some embodiments, receiving a data processing request comprises: receiving a deletion request; and in response to the data processing request, processing the target business data comprises: parsing the deletion request and determining the data identifier to be deleted; searching for target business data corresponding to the data identifier to be deleted; and deleting the target business data. For example, the data processing request comprises a deletion request. When at least one client in the ward sends a deletion request to the server, the deletion request may comprise the data identifier to be deleted, and the server receives the deletion request and in response to the deletion request, determines the data identifier to be deleted. Then, based on the data identifier to be deleted, target business data corresponding to the data identifier to be deleted is searched for, and the target business data is deleted according to the deletion rule corresponding to the deletion request.

In some embodiments, receiving a data processing request comprises: receiving a modification request; and in response to the data processing request, processing the target business data comprises: parsing the modification request and determining the data identifier to be modified; searching for target business data corresponding to the data identifier to be modified; and modifying the target business data. For example, the data processing request comprises a modification request. When at least one client in the ward sends a modification request to the server, the modification request may comprise the data identifier to be modified, and the server receives the modification request and in response to the modification request, determines the data identifier to be modified. Then, based on the data identifier to be modified, target business data corresponding to the data identifier to be modified is searched for, and the target business data is modified according to the modification rule corresponding to the modification request.

Exemplarily, after the first client monitors the blood pressure data of the patient, the blood pressure data may be packaged into a first message, and then sent to the server 200. The server 200 determines whether the format of the first message is at least one of a plurality of first preset formats, and in response to the format of the first message is at least one of the plurality of first preset formats, converts the format of the first message to the second preset format according to preset conversion rule corresponding to the first message format, to obtain the second message, and then stores the second message in the data warehouse 400, and provides a unified standardized data interface 538 so that other systems may access it in real time to obtain the blood pressure data.

In some embodiments, when the second client needs to obtain the blood pressure data of the patient, it can send a data query request to the server. The query request comprises the patient's identity identifier and the data to be queried is blood pressure data, and the server receives and responds to the data query request, and then obtain the corresponding blood pressure data from the data warehouse based on the patient's identity identifier, and call the data interface to send the blood pressure data to the second client.

The message processing method provided by the embodiment of the present disclosure determines whether a format of the first message is at least one of a plurality of first preset formats by receiving a first message sent by at least one client in a ward, and in response to the format of the first message being at least one of the plurality of first preset formats, converting the format of the first message into a second preset format according to a preset conversion rule corresponding to the format of the first message to obtain a second message, and then receiving a data processing request, and in response to the data processing request, processing the second message. Since each of the first messages sent by at least one client in the ward are converted into a unified second preset format, the solution may integrate the data messages of respective client in the smart ward. It may improve the applicability of respective client, so as to realize the data interaction between the respective client, process the data more comprehensively, reduce the construction cost of the smart ward, effectively improve the degree of informatization of the hospital, and greatly improve the work efficiency of the smart ward.

Figure 6:
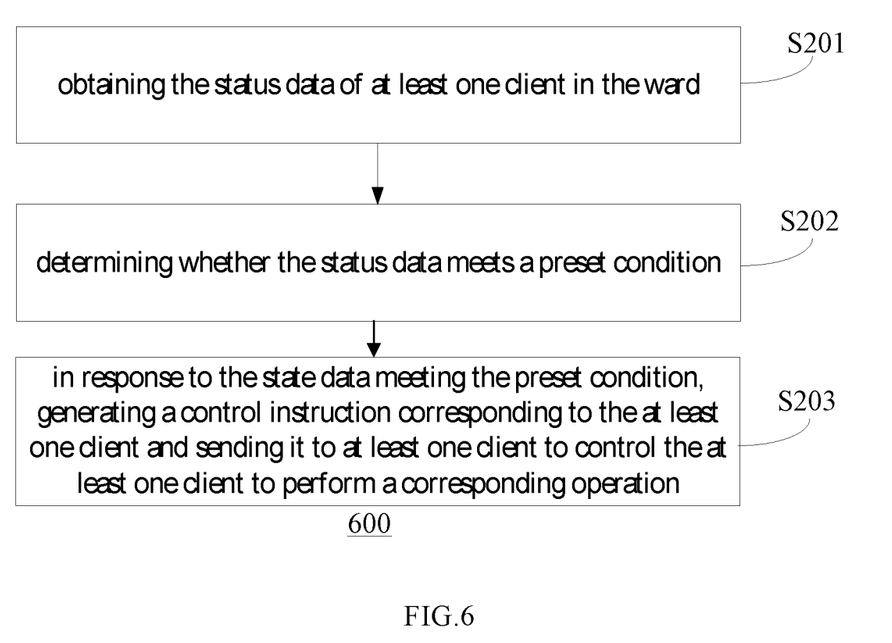
FIG. 6 is a schematic flowchart of a message processing method provided by some embodiments of the disclosure.

FIG. 6 is a flowchart of a method 600 for processing at least one client in a ward provided by an embodiment of the present disclosure. As shown in FIG. 6, the method 600 comprises the following steps:

S201, obtaining the status data of at least one client in the ward.

In some embodiments, step S101 comprises step S201.

Figure 7:
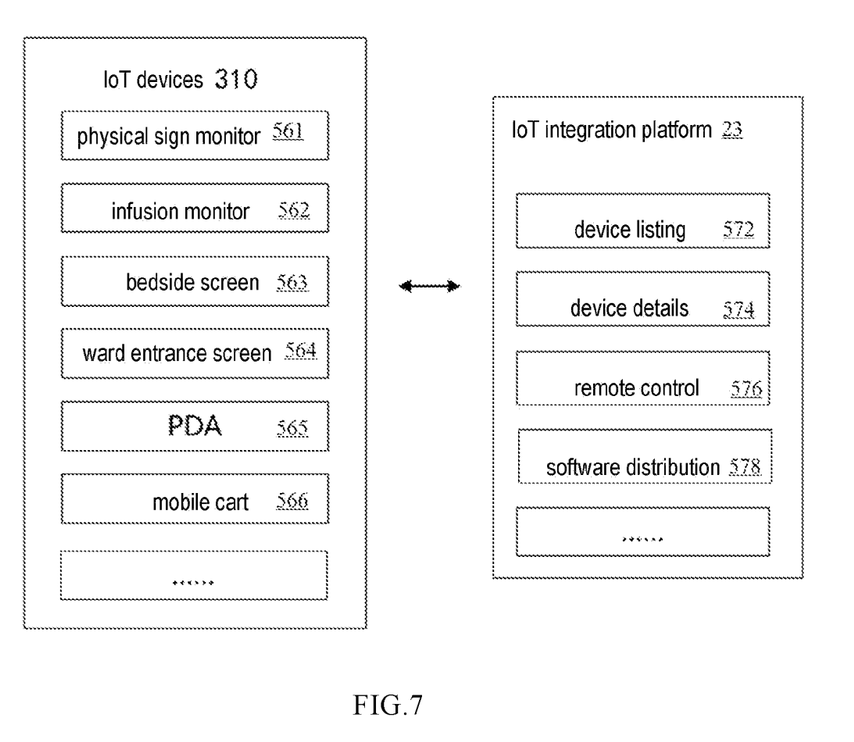
FIG. 7 is a schematic structural diagram of a message processing system provided by some embodiments of the disclosure.

For example, as shown in FIG. 7, at least one client 300 in the ward may comprise an IoT device 310. The IoT integration platform 23 may perform unified management of the connected IoT device 310, such as viewing device listing 572, obtaining device details 574, performing remote control 576, and performing software distribution 578 on the device. IoT device 310 may comprise physical sign monitor 561, infusion monitor 562, bedside screen 563, bedside entrance screen 564, PDA 565, mobile cart 566, etc.

The server 200 may obtain the status data of at least one client 300 in the ward. For example, the user may view the status data of the currently accessed IoT device in the client in real time. The server 200 may also add, delete, enable, and disable corresponding IoT devices. It can receive a variety of communication signals sent by various IoT devices, and convert a plurality of communication signals into a unified format for data interaction processing with the IoT devices.

It should be noted that, the device status data may comprise detailed information such as the user, custodian, network connection status, operating status, location information, signal, address device number, device online status, device operating status, etc. of the accessed IoT device.

S202, determining whether the status data meets a preset condition.

S203, in response to the state data meeting the preset condition, generating and sending a control instruction corresponding to the at least one client to at least one client to control the at least one client to perform a corresponding operation.

In some embodiments, after step S201, the method 100 further comprises steps S202 and S203.

For example, after acquiring the status data of at least one client accessed to the ward, it then determines whether the status data meets the preset condition, and the preset condition is configured in the system in advance. The preset condition is, for example, controlling the screen on the doorway of the ward to light up within a preset time period.

For example, if the server determines that the state data meets the preset condition, it generates a control instruction for the IoT device 310, and sends the control instruction to the IoT device 310 to control the IoT device 310 to perform corresponding operations.

The server may also automatically detect whether the IoT device 310 is abnormal. The abnormalities comprise long disconnection of the network connection, device failure, etc. When an abnormality of the IoT device 310 is detected, it may automatically pop up an abnormal prompt on the client.

It is understandable that when software upgrades or software installations for IoT devices are required, if IoT device 310 is connected to server 200 through electronic device 320, a user may upload the software upgrade package corresponding to the software upgrade or the software installation package corresponding to the software installation to the electronic device 320 in advance, select the IoT device 310 corresponding to the software to be installed in the electronic device 320, and then send the software upgrade package or software installation package to the IoT device 310 corresponding to the software to be installed, so as to realize the software installation and upgrade of IoT device 310.

In addition, it can also be equipped with nursing management-related system application functions, which may comprise configuration items such as intelligent office, quality management, talent training, performance management, and decision analysis.

For example, intelligent office may comprise nursing institution construction, personnel management, shift management, daily work management of the head nurse, daily work management of the nursing department, etc.

For example, quality management may comprise adverse event management, quality inspection, satisfaction inspection, sensitive index management, etc.

For example, talent training may comprise continuing education management, training assessment management, personnel file management, hierarchical management, etc.

For example, performance management may comprise department, individual performance management, etc.

For example, decision analysis may comprise quality analysis, risk warning statistical analysis, workload statistical analysis and satisfaction statistical analysis, etc.

In this embodiment, by judging whether the device status data meets a preset condition, it is possible to realize remote control operations with at least one client in the ward, thereby enabling unified management of IoT devices and being compatible with more IoT devices, so that the ward information exchange smoother, improves the overall scalability of the smart ward, and further improves the work efficiency.

The embodiment of the present disclosure also provides a message processing system. Please continue to refer to FIG. 1. The system comprises a server 200 and at least one client 300 in the ward. At least one client 300 is configured to send a first message to the server 200; and the server 200 is configured to receive a first message sent by at least one client 300 in the ward; determine whether the format of the first message is at least one of a plurality of first preset formats; in response to the format of the first message is at least one of a plurality of first preset formats, convert the format of the first message into a second preset format according to a preset conversion rule corresponding to the format of the first message, so as to obtain a second message; at least one client 300 is further configured to send a data processing request to the server 200; the server 200 is further configured to receive a data processing request; and in response to the data processing request, processing the second message.

For example, the second preset format is a standard information format commonly used by the server.

In the message processing system provided by this embodiment, since the first message sent by at least one client in the ward is converted into a unified preset format (a second preset format), the system may integrate the data messages of independent clients in the smart ward. So, it can be compatible with more clients, improve the applicability of each client, realize the data interaction between the clients, process the data more comprehensively, reduce the construction cost of the smart ward, effectively improve the degree of informatization of the hospital, and greatly improve the work efficiency of the smart ward.

Figure 8:
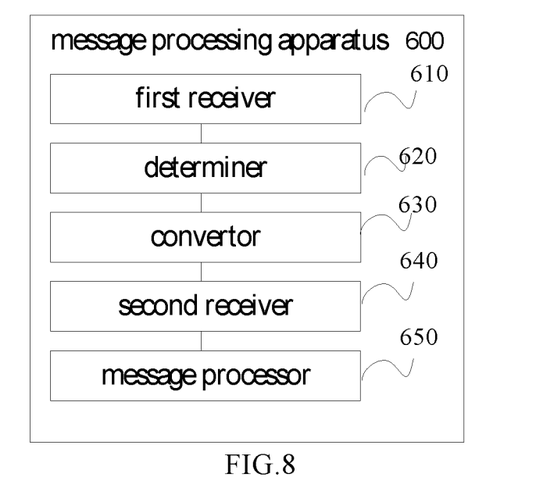
FIG. 8 is a schematic structural diagram of a message processing apparatus provided by some embodiments of the disclosure.

FIG. 8 is a schematic structural diagram of a message processing apparatus 600 provided by an embodiment of the present disclosure. For example, the message processing apparatus may be an apparatus comprised in the server 200. As shown in FIG. 8, the message processing apparatus 600 may comprise:

a first receiver 610, configured to receive a first message sent by at least one client in a ward;

a determiner 620, configured to determine whether a format of the first message is at least one of a plurality of first preset formats;

a converter 630, configured to in response to the format of the first message being at least one of the plurality of first preset formats, convert the format of the first message into a second preset format according to a preset conversion rule corresponding to the format of the first message to obtain a second message;

a second receiver 640, configured to receive a data processing request; and a message processor 650, configured to process the second message in response to the data processing request.

Figure 9:
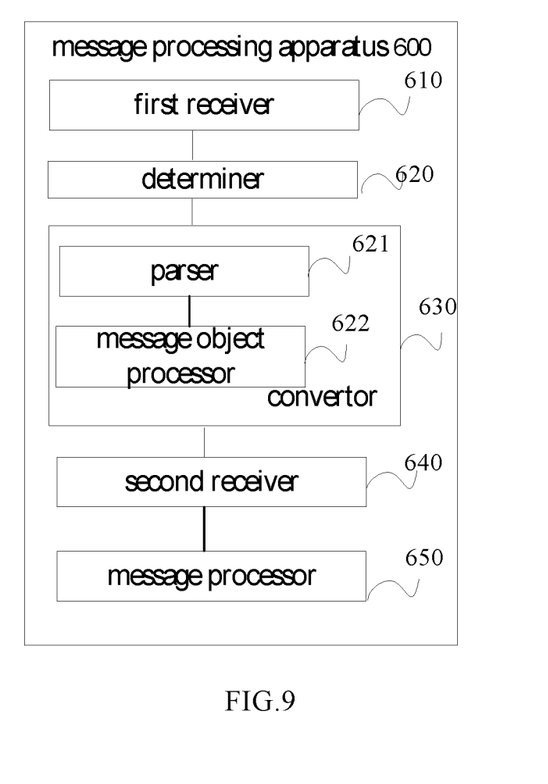
FIG. 9 is a schematic structural diagram of a message processing apparatus provided by some embodiments of the disclosure.

In some embodiments, as shown in FIG. 9, the converter 630 comprises:

a parser 621, configured to parse the first message according to the parsing rules corresponding to the format of the first message to obtain a message object;

a message object processor 622, configured to, according to a preset editing rule, process the message object to obtain the second message.

For example, the first receiver 610 and the second receiver 640 may be the same component.

The message processing apparatus provided in the embodiment of the present disclosure can implement any one of the above message processing methods, and details are not described herein again.

In the message processing apparatus provided by the embodiment of the present disclosure, a first receiver is configured to receive a first message sent by at least one client in a ward, a determiner is configured to determine whether a format of the first message is at least one of a plurality of first preset formats; a converter is configured to in response to the format of the first message being at least one of the plurality of first preset formats, convert the format of the first message into a second preset format according to a preset conversion rule corresponding to the format of the first message to obtain a second message; a second receiver is configured to receive a data processing request; and a message processor is configured to process the second message in response to the data processing request. Since each of the first messages sent by at least one client in the ward are converted into a unified second preset format, the solution may integrate the data messages of respective client in the smart ward. So, it may be compatible with more clients, improve the applicability of respective client, so as to realize the data interaction between the respective client, process the data more comprehensively, reduce the construction cost of the smart ward, effectively improve the degree of informatization of the hospital, and greatly improve the work efficiency of the smart ward.

The embodiment of the disclosure provides a computing device, the computing device comprises a memory, a processor, and computer instructions stored in the memory and executable on the processor, the processor being configured to implement any of the data processing method as above when the program is executed.

Figure 10:
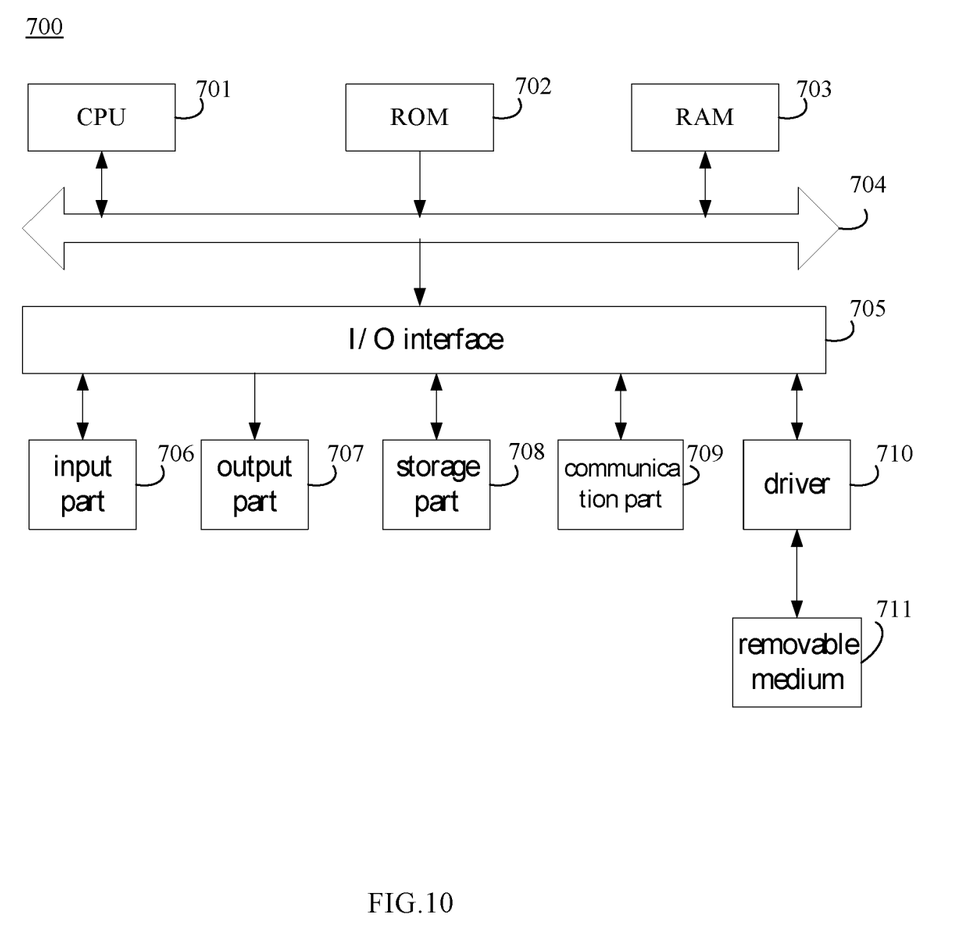
FIG. 10 is a schematic structural diagram of a computing device provided by some embodiments of the disclosure.

Refer to FIG. 10 below, which is a schematic structural diagram of a computing device 700 according to an embodiment of the disclosure. For example, computing device 700 may act as the server 200 shown in FIG. 1 or at least one client 300.

As shown in FIG. 10, the computing device 700 comprises a central processing unit (CPU) 701, which may perform various appropriate actions and processing according to a program stored in a read-only memory (ROM) 702 or a program loaded from a storage part 703 into a random access memory (RAM) 703. In RANI 703, various programs and data required for system 700 operation are also stored. The CPU 701, ROM 702, and RANI 703 are connected to each other through a bus 704. An input/output (I/O) interface 705 is also connected to the bus 704.

The following components are connected to the I/O interface 705: an input part 706 comprising a keyboard, a mouse, etc.; an output part 707 comprising a cathode ray tube (CRT), a liquid crystal display (LCD), etc., and a speaker, etc.; a storage part 708 comprising a hard disk, etc.; and the communication part 709 comprising a network interface card such as a LAN card, a modem, and the like. The communication part 709 performs communication processing via a network such as the Internet. The driver 710 is also connected to the I/O interface 705 as needed. A removable medium 711, such as a magnetic disk, an optical disk, a magneto-optical disk, a semiconductor memory, etc., is installed on the drive 710 as needed, so that the computer program read therefrom is installed into the storage portion 708 as needed.

In particular, according to an embodiment of the present disclosure, the process described above with reference to the flowchart may be implemented as a computer software program. For example, various embodiments of the present disclosure provide a computer program product, which comprises a computer program carried on a machine-readable medium, and the computer program comprises program code configured to execute the method shown in the flowchart. In such an embodiment, the computer program may be downloaded and installed from the network through the communication part 703, and/or installed from a removable medium 711. When the computer program is executed by the central processing unit (CPU) 701, the above-mentioned functions defined in the system of the present disclosure are executed.

The embodiments of the present disclosure also provide a non-transitory computer-readable storage medium having computer instructions stored thereon, the computer instructions being configured to implement any of the above message processing methods. It should be noted that the non-transitory computer-readable medium shown in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or a combination of any of the above. More specific examples of computer-readable storage medium may comprise, but are not limited to: electrical connections with one or more wires, portable computer disks, hard disks, random access memory (RAM), read-only memory (ROM), erasable programmable read-only memory (EPROM or flash memory), optical fibre, portable compact disk read-only memory (CD-ROM), optical storage device, magnetic storage device, or any suitable combination of the above. In the present disclosure, a computer-readable storage medium may be any tangible medium that contains or stores a program, and the program may be used by or in combination with an instruction execution system, apparatus, or device. In the present disclosure, a computer-readable signal medium may comprise a data signal propagated in a baseband or as a part of a carrier wave, and a computer-readable program code is carried therein. This propagated data signal may take various forms, comprising but not limited to electromagnetic signals, optical signals, or any suitable combination of the above. The computer-readable signal medium may also be any computer-readable medium other than the computer-readable storage medium. The computer-readable medium may send, propagate, or transmit a program configured to be used by or in combination with an instruction execution system, apparatus or device. The program code contained on the computer-readable medium may be transmitted by any suitable medium, comprising but not limited to: wireless, wire, optical cable, RF, etc., or any suitable combination of the above.

The non-transitory computer-readable storage medium may be comprised in the electronic device described in the embodiments; or it may exist alone without being assembled into the electronic device. The non-transitory computer-readable storage medium stores one or more programs, and the foregoing programs are used by one or more processors for preforming the message processing method described in the present disclosure.

The flowcharts and block diagrams in the drawings illustrate the possible implementation architecture, functions, and operations of the systems, methods, and computer program products according to various embodiments of the present disclosure. In this regard, each block in the flowchart or block diagram may represent a module, program segment, or part of the code, and the foregoing module, program segment, or part of the code contains one or more executable instructions configured to implement the specified logical function. It should also be noted that, in some alternative implementations, the functions marked in the block may also occur in a different order from the order marked in the drawings. For example, two blocks shown in succession may actually be executed substantially in parallel, and they may sometimes be executed in the reverse order, depending on the functions involved. It should also be noted that each block in the block diagram and/or flowchart, and the combination of blocks in the block diagram and/or flowchart, may be implemented by a dedicated hardware-based system that performs the specified function or operation, or may be implemented by a combination of dedicated hardware and computer instructions.

The units or modules described in the embodiments of the present disclosure may be implemented in software or hardware. The described unit or module may also be provided in the processor, for example, it may be described as: a processor comprises a first receiver, a determiner, a convertor, a second receiver, and a message processor. The names of these units or modules do not constitute a limitation on the unit or module itself under certain circumstances. For example, the first receiver may also be described as "configured to receive the first message sent by at least one client in the ward".

The above description only involves preferred embodiments of the present disclosure and an explanation of the applied technical principles. Those skilled in the art should understand that the scope of the disclosure involved in this disclosure is not limited to the technical solutions formed by the specific combination of the technical features, and should also cover other technical solutions formed by arbitrarily combining equivalent features without departing from the disclosed concept. For example, the features and the technical features disclosed in the present disclosure (but not limited to) having similar functions are replaced with each other to form a technical solution.

The invention claimed is:

1. A message processing method, the method comprising:
receiving a first message sent by a first client in a ward;
determining whether a format of the first message is at least one of a plurality of first preset formats;
in response to the format of the first message being at least one of the plurality of first preset formats, converting the format of the first message into a second preset format according to a preset conversion rule corresponding to the format of the first message to obtain a second message;
storing the second message in a data warehouse including a standardized data interface;
receiving a data processing request from a second client in the ward; and
obtaining the second message via the standardized data interface and processing the second message in response to the data processing request,
wherein the receiving the data processing request comprises receiving a message data volume checking instruction, the message data volume checking instruction comprises a second client identifier,
wherein the processing the second message in response to the data processing request comprises in response to the message data volume checking instruction, counting a data volume of the second message corresponding to the second client identifier, and
wherein, the method further comprising:
sending the data volume to the second client corresponding to the second client identifier after the counting the data volume of the second message corresponding to the second client identifier.

2. The method according to claim 1, wherein the converting the format of the first message into a second preset format according to a preset conversion rule corresponding to the format of the first message to obtain a second message comprises: parsing the first message according to a parsing rule corresponding to the format of the first message to obtain a message object; and according to a preset editing rule, processing the message object to obtain the second message.

3. The method according to claim 1, the method further comprises:
monitoring an interface status of the first client in the ward,
wherein the receiving the first message sent by the first client in the ward comprises: in response to an interface status indicating that there is a new first message, receiving the first message sent by the first client corresponding to the standardized data interface.

4. The method according to claim 1, wherein the receiving a data processing request comprises: receiving a message status checking instruction,
wherein the message status checking instruction comprises a first client identifier,
wherein the processing the second message in response to the data processing request comprises: in response to the message status checking instruction, monitoring the message status of the second message corresponding to the first client identifier, and
wherein, the method further comprises: sending the message status to the first client corresponding to the first client identifier after the monitoring the message status of the second message corresponding to the first client identifier.

5. The method according to claim 4, wherein the monitoring the message status of the second message corresponding to the first client identifier comprises: based on the message status, determining whether an alarm condition is met; and in response to the alarm condition is met, sending alarm prompt information to the first client corresponding to the first client identifier.

6. The method according to claim 1, wherein the receiving a data processing request comprises: receiving a disconnection request, the disconnection request comprises a second client identifier, and wherein, after the receiving a disconnection request, the method further comprises: in response to the disconnection request, disconnecting the second client corresponding to the second client identifier.

7. The method according to claim 1, wherein the second message comprises at least one business data corresponding to the at first client, and wherein the processing the second message in response to the data processing request comprises: in response to the data processing request, processing the at least one business data.

8. The method according to claim 7, wherein the data processing request comprises a data identifier, and wherein the in response to the data processing request,
processing the at least one business data comprises: in response to the data processing request, processing a target business data, the target business data is business data corresponding to the data identifier in the at least one business data.

9. The method according to claim 8, wherein the receiving a data processing request comprises: receiving a query request, and wherein the in response to the data processing request, processing a target business data comprises:
parsing the query request to determine the data identifier to be queried; and based on the data identifier to be queried, obtaining the target business data and sending the target business data to the second client.

10. The method according to claim 8, wherein the receiving a data processing request comprises: receiving a deletion request, and wherein the in response to the data processing request, processing a target business data comprises:
parsing the deletion request and determining the data identifier to be deleted; searching for target business data corresponding to the data identifier to be deleted; and deleting the target business data.

11. The method according to claim 8, wherein the receiving a data processing request comprises: receiving a modification request, and wherein the in response to the data processing request, processing a target business data comprises:
parsing the modification request and determining the data identifier to be modified;
searching for target business data corresponding to the data identifier to be modified;
and modifying the target business data.

12. The method according to claim 1, wherein the receiving the first message sent by the first client in a ward comprises: obtaining a status data of the first client in the ward,
and wherein, the method further comprises:
determining whether the status data meets a preset condition; and in response to the status data meets the preset condition, generating a control instruction corresponding to the first client and sending the control instruction to the first client to control the first client to perform a corresponding operation.

13. The method according to claim 1, wherein the first client comprises at least one of an intelligent phone, a personal computer, a tablet computer, an infusion monitor, a physical sign monitor, an intelligent blood pressure meter, an intelligent blood glucose meter, a medical personal digital assistant, a ward mobile cart, a ward TV voice remote control, a ward intelligent speaker, a ward door or window, or a ward curtain.

14. The method according to claim 1, wherein the first message comprises at least one of a medical event message, a medical behavior message, or patient information.

15. A computing device, the computing device comprising a memory, a processor, and computer instructions stored in the memory and executable on the processor, the processor being configured to implement the message processing method according to claim 1, when executing the computer instructions.

16. A non-transitory computer-readable storage medium having computer instructions stored thereon, the computer instructions being configured to implement the message processing method according to claim 1.

17. A message processing system, the message processing system comprising:
a server; and
a first client and a second client in a ward,
wherein the first client is configured to send a first message to the server,
wherein the server is configured to receive a first message sent by the first client in the ward, determine whether a format of the first message is at least one of a plurality of first preset formats, in response to the format of the first message being at least one of the plurality of first preset formats, convert the format of the first message into a second preset format according to a preset conversion rule corresponding to the format of the first message, so as to obtain a second message, and store the second message in a data warehouse including a standardized data interface;
wherein the second client is configured to send a data processing request to the server;
wherein the server is further configured to receive the data processing request by receiving a message data volume checking instruction, the message data volume checking instruction comprising a second client identifier, and is configured to obtain the second message via the standardized data interface and process the second message in response to the data processing request by counting a data volume of the second message corresponding to the second client identifier in response to the message data volume checking instruction, and wherein the server is further configured to send the data volume to the second client corresponding to the second client identifier after the counting the data volume of the second message corresponding to the second client identifier.

18. The message processing system according to claim 17, wherein the second preset format is a standard information format commonly used by the server.

\* \* \* \* \*